United States Patent
Smith et al.

(10) Patent No.: US 9,239,118 B2
(45) Date of Patent: Jan. 19, 2016

(54) VALVE INCLUDING MULTILAYER WEAR PLATE

(71) Applicant: HAMILTON SUNDSTRAND CORPORATION, Windsor Locks, CT (US)

(72) Inventors: Blair A. Smith, South Windsor, CT (US); Kevin M. Rankin, Windsor, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 346 days.

(21) Appl. No.: 13/869,427

(22) Filed: Apr. 24, 2013

(65) Prior Publication Data
US 2014/0319398 A1    Oct. 30, 2014

(51) Int. Cl.
*F16K 1/22* (2006.01)
*F16K 1/226* (2006.01)

(52) U.S. Cl.
CPC ............... *F16K 1/2268* (2013.01); *F16K 1/224* (2013.01)

(58) Field of Classification Search
CPC ......... F16K 1/2268; F16K 1/224; C23C 4/08; C23C 28/02; C23C 28/023
USPC .......................................... 251/305, 308, 368
See application file for complete search history.

(56) References Cited

U.S. PATENT DOCUMENTS

| | | | |
|---|---|---|---|
| 4,512,863 A | 4/1985 | Criss et al. | |
| 6,435,826 B1 | 8/2002 | Allen et al. | |
| 6,435,835 B1 | 8/2002 | Allen et al. | |
| 6,590,711 B1 | 7/2003 | Gardner et al. | |
| 6,911,631 B2 | 6/2005 | Nilsson et al. | |
| 7,207,374 B2 | 4/2007 | Persky et al. | |
| 7,241,506 B2 | 7/2007 | Hartig | |
| 7,575,039 B2 | 8/2009 | Beals et al. | |
| 7,581,581 B2 | 9/2009 | Persky et al. | |
| 7,802,613 B2 | 9/2010 | Bullied et al. | |
| 7,879,459 B2 | 2/2011 | Freling et al. | |
| 2003/0102107 A1 | 6/2003 | Nilsson et al. | |
| 2004/0048090 A1* | 3/2004 | Creech et al. | 428/621 |
| 2005/0008852 A1 | 1/2005 | Hartig | |
| 2007/0248791 A1 | 10/2007 | Hartig | |
| 2008/0083450 A1 | 4/2008 | Benoit et al. | |
| 2009/0324892 A1 | 12/2009 | Hasegawa et al. | |
| 2010/0143743 A1 | 6/2010 | Yamasaki et al. | |
| 2010/0215840 A1 | 8/2010 | Grunwald | |
| 2010/0276103 A1 | 11/2010 | Bullied et al. | |
| 2012/0181467 A1* | 7/2012 | Dowd et al. | 251/301 |

FOREIGN PATENT DOCUMENTS

| | | |
|---|---|---|
| EP | 1111192 B1 | 8/2005 |
| EP | 1652602 A2 | 5/2006 |
| EP | 1652602 B1 | 12/2008 |
| EP | 1524045 B1 | 7/2010 |
| EP | 1801263 B1 | 3/2013 |

* cited by examiner

*Primary Examiner* — Marina Tietjen
(74) *Attorney, Agent, or Firm* — Cantor Colburn LLP

(57) ABSTRACT

A valve is provided and includes a component including a surface and a wear plate including a surface disposed in sliding engagement with the surface of the component. The surface of the wear plate includes a corrosion resistant substrate, a secondary layer disposed on a surface of the corrosion resistant substrate, a noble metal layer disposed on a surface of the secondary layer and a tertiary layer disposed on a surface of the noble metal layer.

17 Claims, 3 Drawing Sheets

VALVE INCLUDING MULTILAYER WEAR PLATE

BACKGROUND OF THE INVENTION

Aspects of the present invention are directed to a valve and, more particularly, to a valve including a multilayer wear plate.

Multilayer articles are used in a wide variety of applications where different metals are utilized to provide the articles with different sets of properties. For example, an article can be formed from steel to provide strength, hardness and rigidity. For extreme environments, such as high temperature and/or corrosive or oxidizing environments, stainless steel or more exotic alloys can provide resistance to corrosion or oxidation.

In some applications, such as where an article has a metallic wear surface that is in sliding engagement or contact with the surface of another component, the surface of the metallic article may not provide adequate lubricity to meet the wear needs of the application. In such cases, a wear layer can be disposed on the appropriate surface of the article to provide the desired wear surface properties. Polymeric layers, such as layers of fluoropolymers may be used for such wear surface applications. However, polymers are often not suitable for high temperature applications like those found in aircraft air management systems. Indeed, valves in these systems are required to be operable at elevated temperatures in excess of 300° C. and with high vibration modes with little or no lubrication. As such, wear out of critical sliding components in these valves (i.e., the valve wear plate) is common and can degrade valve performance.

BRIEF DESCRIPTION OF THE INVENTION

According to an exemplary embodiment, a valve is provided and includes a component including a surface and a wear plate including a surface disposed in sliding engagement with the surface of the component. The surface of the wear plate includes a corrosion resistant substrate, a secondary layer disposed on a surface of the corrosion resistant substrate, a noble metal layer disposed on a surface of the secondary layer and a tertiary layer disposed on a surface of the noble metal layer.

In another exemplary embodiment, a wear plate of a valve including a component is provided. The wear plate includes a surface disposed in sliding engagement with a surface of the component. The surface of the wear plate includes a substrate including one or more of corrosion resistant steel, Inconels™, Incoloys™, Hastelloys™, Waspaloys™, Elgiloy™ and Haynes™ alloys, a secondary layer disposed on a surface of the substrate, a noble metal layer disposed on a surface of the secondary layer and a tertiary layer disposed on a surface of the noble metal layer.

In yet another exemplary embodiment, a butterfly valve is provided and includes a valve housing formed to define a bore, a disc and shaft set operably disposed in the bore, the disc and shaft set including a wear plate disposed in abutment with a shim and an actuator coupled to the disc and shaft set to thereby cause the disc and shaft set to rotate about a long axis of the shaft such that a surface of the wear plate slidably engages with a flange surface of the shaft. The surface of the wear plate includes a corrosion resistant substrate, a secondary layer disposed on a surface of the corrosion resistant substrate, a noble metal layer disposed on a surface of the secondary layer and a tertiary layer disposed on a surface of the noble metal layer.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawing in which:

DETAILED DESCRIPTION OF THE INVENTION

To resolve the issues of wear noted above for a valve including a wear plate, such as a pneumatic butterfly valve, the wear plate load bearing surfaces are coated with a low friction silver coating. The silver coating reduces friction and wear that result from thrust loads on the shaft during operation. For ease of manufacturing and assembly, the silver coating is applied to all surfaces of the wear plate and, in combination with the hard-face coatings and substrate materials that form the remaining components of the valve, lead to a robust system.

Figure 1:
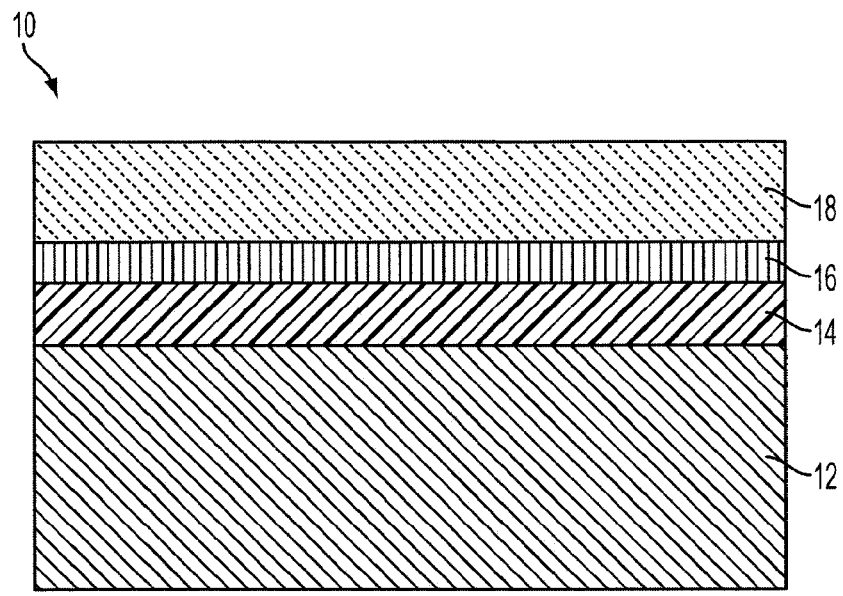
FIG. 1 is a schematic representation of a cross-sectional view of an embodiment of a multilayer article.

A simplified multilayer article is schematically shown in an exploded cross-sectional view in FIG. 1, in which article 10 includes a substrate 12. The substrate 12 may be formed of corrosion resistant material, such as one or more of stainless steel, Inconels™, Incoloys™, Hastelloys™, Waspaloys™, Elgiloy™, and Haynes™ alloys. A secondary metallic layer 14 is disposed on the substrate 12 and may be formed of nickel, copper or other similar materials by electroplating, thermal spraying or other similar processes. A noble metal layer 16 is disposed on the secondary metallic layer 14. The noble metal layer 16 may be formed of a noble metal selected from the group including gold, platinum, palladium, rhodium and combinations thereof by electroplating, thermal spraying or other similar processes. A tertiary metallic layer 18 is disposed on the noble metal layer 16 and may be formed of silver by electroplating, thermal spraying or other similar processes.

Figure 2:
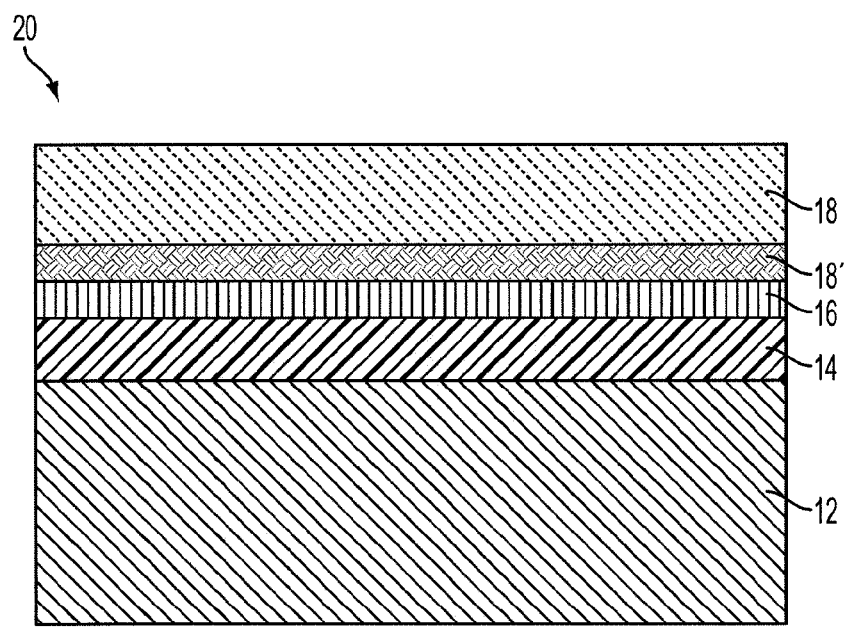
FIG. 2 is a schematic representation of a cross-sectional view of another embodiment of a multilayer article.

Another embodiment is shown in FIG. 2. In FIG. 2, article 20 includes a substrate 12. The substrate 12 may be formed of corrosion resistant material, such as one or more of stainless steel, Inconels™, Incoloys™, Hastelloys™, Waspaloys™, Elgiloy™, and Haynes™ alloys. A secondary metallic layer 14 is disposed on the substrate 12 and may be formed of nickel, copper or another similar material by electroplating, thermal spraying or other similar processes. A noble metal layer 16 is disposed on the secondary metallic layer 14. The noble metal layer 16 may be formed of a noble metal selected from the group including gold, platinum, palladium, rhodium and combinations thereof by electroplating, thermal spraying or other similar processes. A tertiary metallic layer 18 is disposed on the noble metal layer 16 and may be formed of silver by electroplating, thermal spraying or other similar processes. The tertiary metallic layer 18 may include strike layer 18'. Strike layer 18' may be formed of silver and is disposed as a relatively thin layer between the noble metal layer 16 and a main portion of the tertiary metal layer 18.

The strike layer 18' may be added to improve adhesion between the tertiary metallic layer 18 and the undercoatings. The strike layer 18' is substantially thinner than the tertiary metallic layer 18 and may be about 0.1 to about 2.5 µm thick (about 0.000004 to 0.0001 inches).

The substrate 12 of FIGS. 1 and 2 can be fabricated from any known type of corrosion resistant materials in order to provide the article with desired properties. These corrosion resistant materials may include but are not limited to austenitic stainless steel (e.g., stainless steel alloys from the 300 series such as SS304, SS306, SS316), martensitic stainless steel alloys including precipitation-hardened martensitic stainless steel, ferritic stainless steels and combinations thereof.

The secondary metallic layer 14 of FIGS. 1 and 2 may include nickel and enhances compatibility and adhesion between the substrate 12 and the overlying layer(s). In an exemplary embodiment, the secondary metallic layer 14 may be formed by electroplating, thermal spraying or other similar processes as a strike layer and has a thickness of about 0.25 µm to about 25 µm (about 0.00001 inches to about 0.001 inches). In another exemplary embodiment, the secondary metallic layer 14 includes pure or nearly pure nickel.

The tertiary metallic layer 18 may include silver. Silver can provide sufficient lubricity for use as a wear layer (as used herein, "wear layer" means a surface layer that, during use, is in slidable engagement with another surface), and in an exemplary embodiment, the tertiary metallic layer 18 is provided as a wear layer. In another exemplary embodiment, the tertiary metallic layer 18 has a thickness of about 0.25 µm to about 250 µm (about 0.00001 inches to about 0.01 inches). In another exemplary embodiment, the tertiary metallic layer 18 includes pure or nearly pure silver.

The noble metal layer 16 includes a noble metal selected from the group including gold, platinum, palladium and rhodium and combinations thereof. Although the present invention and the scope thereof is not bound by any particular embodiments, as temperature increases, the solubility of oxygen in silver may increase and thus exposure to an oxygen-containing atmosphere (i.e., air at elevated temperatures) can allow oxygen to diffuse through the silver of the tertiary metallic layer 18, as described above. The increased solubility of oxygen in silver at elevated temperatures can allow oxygen to diffuse through the silver and oxidize the materials of the underlying secondary metallic layer 14, which may lead to blistering and/or delamination of the tertiary metallic layer 18.

The noble metal layer 16 thus provides a barrier to prevent dissolved oxygen from reaching the secondary metallic layer 14, while itself being resistant to oxidation. In an exemplary embodiment, the noble metal layer 16 is sufficiently resistant to oxidation and/or penetration by oxygen so as to prevent blistering and/or delamination of the tertiary metallic layer 18 when the article 10, 20 is exposed to a temperature of at least 510° C. (950° F.) for about 64 hours and for an additional 16 hours at about 629° C. (1164° F.). In accordance with embodiments, the noble metal layer 16 may be formed of gold, platinum, palladium, rhodium and combinations thereof. In another exemplary embodiment, the noble metal layer 16 has a thickness of about 0.7 µm to about 1.3 µm (about 0.00002 to about 0.00005 inches).

As mentioned above, the tertiary metallic layer 18 can be a wear layer on an article to be used for high temperature applications. The article can be used for any application requiring a wear layer where the article will be subject to exposure to an oxygen-containing atmosphere (e.g., air) at high temperatures such as in moving contact parts on valves used in high-temperature environments (e.g., combustion engine-mounted valves), mechanical or electromechanical actuator devices used in high-temperature environments, and the like.

Figure 3:
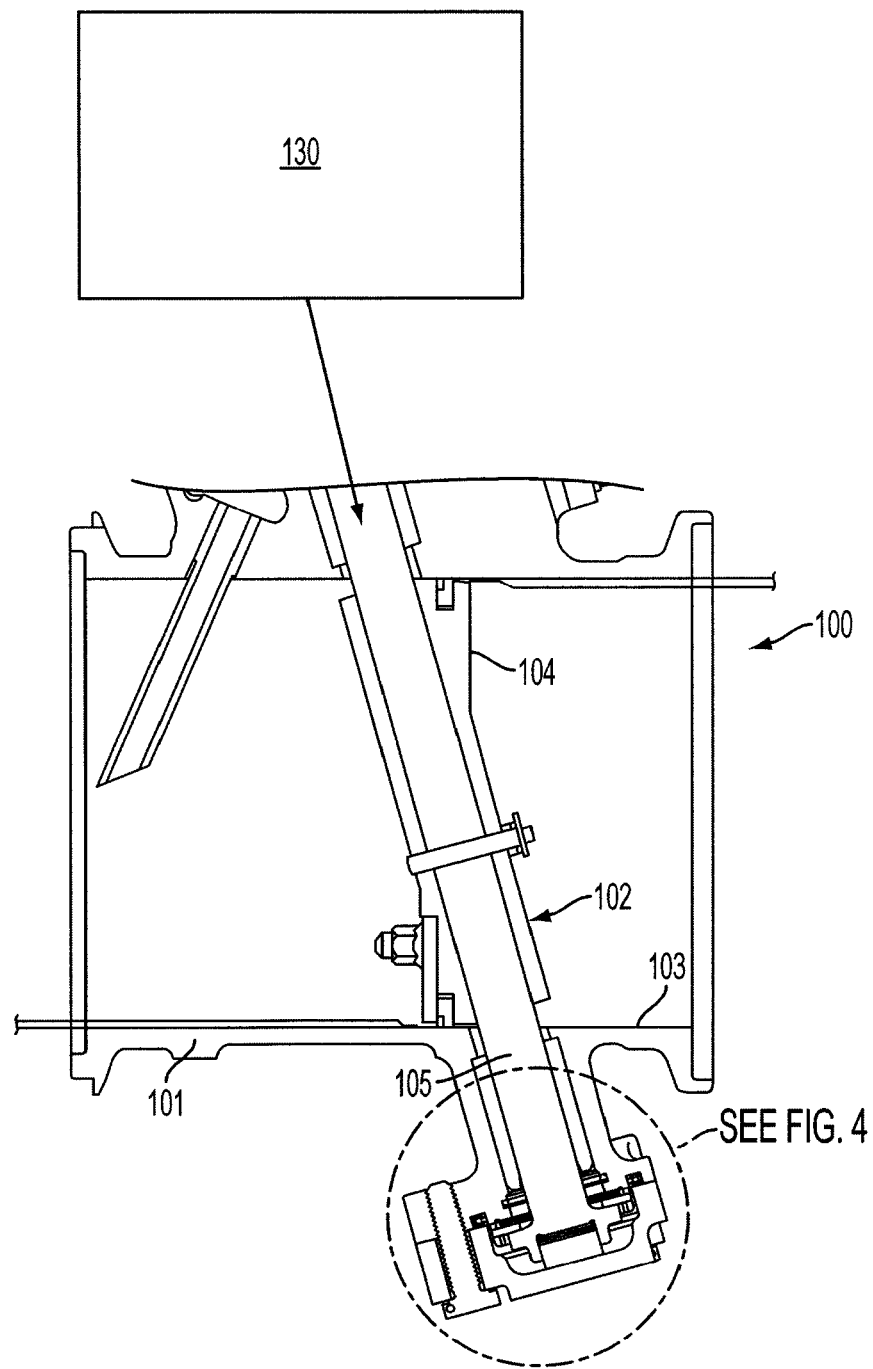
FIG. 3 is a cross-sectional view of a valve including a multilayer wear plate.
Figure 4:
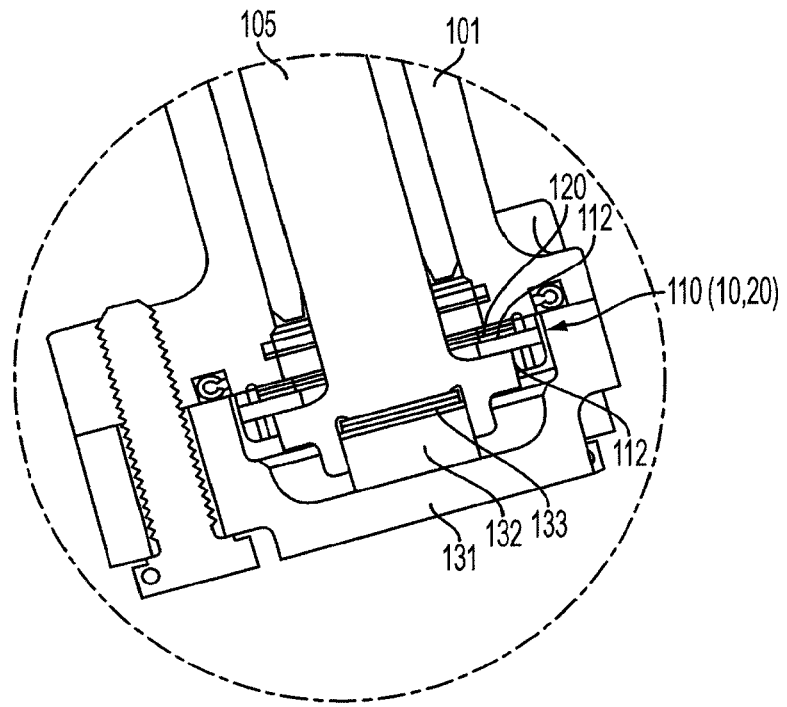
FIG. 4 is an enlarged view of a portion (encircled) of the valve of FIG. 3.
Figure 5:
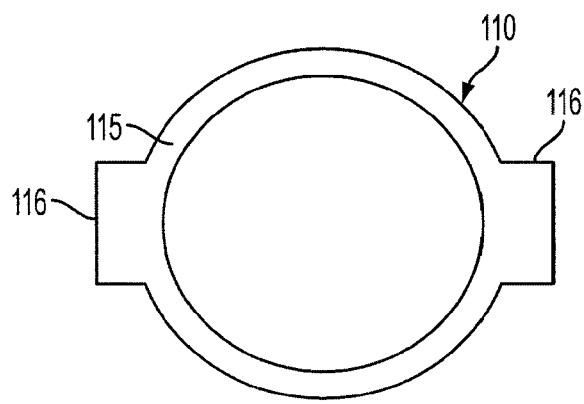
FIG. 5 is a plan view of the wear plate of the valve of FIGS. 3 and 4.

With reference to FIGS. 3-5, the articles 10, 20 may be provided for use in a butterfly valve 100. As shown in FIGS. 3 and 4, the butterfly valve 100 includes a valve housing 101, a disc and shaft set 102, an actuator 130 and a thrust plate 131. The valve housing 101 is formed to define a bore 103 that extends through the valve housing 101 in a longitudinal dimension. The disc and shaft set 102 includes a disc 104 that is coupled to sidewalls of the bore 103 and a butterfly shaft 105 that is supportively coupled with the disc 104. The disc and shaft set 102 is operably disposed in the bore 103 and further includes a wear plate 110 (see FIG. 4) that is disposed in abutment with one or more shim(s) 120 (see FIG. 4) of the valve housing 101.

The actuator 130 is coupled to the disc and shaft set 102. The thrust plate 131 defines a cavity in which a thrust plug 132 is disposed. The thrust plug 132 is affixed to the thrust plate 131 and is coupled to an end of the butterfly shaft 105 via a solid disc 133. The actuator 130 is thus configured to cause the disc and shaft set 102 to rotate about a long axis of the disc 104, which is defined along the longitudinal dimension.

The wear plate 110 is provided substantially similarly as the articles 10, 20. The wear plate 110 is disposed between a shoulder of the butterfly shaft 105 and the one or more shim(s) 120. As such, when the disc and shaft set 102 rotate about the long axis of the disc 104, a surface 112 of the wear plate 110 slidably engages with a surface of the one or more shim(s) 120. In accordance with embodiments, the surface 112 of the wear plate 110 includes the features of the articles 10, 20 described above. Thus, the surface 112 includes the substrate 12, the secondary metallic layer 14, the noble metal layer 16 and the tertiary metallic layer 18. In accordance with further embodiments, the substrate 12 may include corrosion resistant steel, the secondary metallic layer 14 may include nickel, the noble metal layer 16 may include at least one or more of gold, platinum, palladium, rhodium and combinations thereof and the tertiary metallic layer 18 may include a strike layer 18' and may be formed of silver. In addition, the noble metal layer 16 may be about 0.7 µm to about 1.3 µm (about 0.00002 to about 0.000050 inches) thick and the tertiary metallic layer may be about 0.25 µm to about 250 µm (about 0.00001 to about 0.01 inches) thick.

As shown in FIG. 5, the wear plate 110 includes a body 115 having opposing planar faces. The body 115 is formed to define an aperture that extends from face-to-face. The wear plate 110 further includes opposing flanges 116 that extend radially outwardly from an outer diameter of the body 115 at opposite sides thereof. The flanges 116 serve to prevent rotation with respect to the shim(s) 120.

With the surface 112 of the wear plate 110 formed in this manner, the noble metal layer 16 serves to protect the secondary metallic layer 14 from oxidation or other similar effects due to dissolved oxygen diffusing through the tertiary metallic layer 18 which, if allowed to reach the secondary metallic layer 14, would ultimately cause the tertiary metallic layer 18 to blister during operation. This protection against oxidation or the other similar effects is provided even at elevated temperatures and pressures and in high vibration environments, such as those associated with operational aircraft gas turbine engines.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A valve, comprising:
   a component including a surface; and
   a wear plate including a surface disposed in sliding engagement with the surface of the component, the surface of the wear plate comprising:
   a corrosion resistant substrate;
   a secondary layer disposed on a surface of the corrosion resistant substrate;
   a noble metal layer disposed on a surface of the secondary layer;
   a tertiary layer disposed on a surface of the noble metal layer; and
   a strike layer interposed between the noble metal layer and the tertiary layer.

2. The valve according to claim 1, wherein the corrosion resistant substrate comprises steel.

3. The valve according to claim 1, wherein the secondary layer comprises nickel, copper or a combination thereof.

4. The valve according to claim 1, wherein the noble metal layer comprises at least one or more of gold, platinum, palladium and rhodium.

5. The valve according to claim 1, wherein the noble metal layer is about 0.7 μm to about 1.3 μm thick.

6. The valve according to claim 1, wherein the tertiary layer comprises silver.

7. The valve according to claim 1, wherein the tertiary metallic metal layer is about 0.25 μm to about 250 μm thick.

8. The valve according to claim 1, wherein the strike layer comprises a silver layer that is about 0.1 μm to about 2.5 μm thick.

9. A wear plate of a valve including a component, the wear plate comprising:
   a surface disposed in sliding engagement with a surface of the component, the surface of the wear plate comprising:
   a substrate including corrosion resistant steel;
   a secondary layer disposed on a surface of the substrate;
   a noble metal layer disposed on a surface of the secondary layer;
   a tertiary layer disposed on a surface of the noble metal layer; and
   a strike layer interposed between the noble metal layer and the tertiary layer.

10. The valve according to claim 9, wherein the noble metal layer comprises at least one or more of gold, platinum, palladium, rhodium and combinations thereof.

11. The valve according to claim 9, wherein the secondary layer is about 0.25 μm to about 25 μm and the noble metal layer is about 0.7 μm to about 1.3 μm thick.

12. The valve according to claim 9, wherein the tertiary layer comprises silver.

13. The valve according to claim 9, wherein the tertiary layer is about 0.25 μm to about 250 μm thick.

14. The valve according to claim 9, wherein the strike layer comprises a silver layer that is about 0.1 μm to about 2.5 μm thick.

15. A butterfly valve, comprising:
   a valve housing formed to define a bore;
   a disc and shaft set operably disposed in the bore, the disc and shaft set including a wear plate disposed in abutment with a shim; and
   an actuator coupled to the disc and shaft set to thereby cause the disc and shaft set to rotate about a long axis of the shaft such that a surface of the wear plate slidably engages with a flange surface of the shaft,
   the surface of the wear plate comprising:
   a corrosion resistant substrate;
   a secondary layer disposed on a surface of the corrosion resistant substrate;
   a noble metal layer disposed on a surface of the secondary layer;
   a tertiary layer disposed on a surface of the noble metal layer; and
   a silver strike layer that is about 0.1 μm to about 2.5 μm thick interposed between the noble metal layer and the tertiary layer.

16. The valve according to claim 15, wherein the wear plate comprises flanges that extend radially outwardly from an outer diameter of the wear plate at opposite sides thereof.

17. The valve according to claim 15, wherein the corrosion resistant substrate comprises corrosion resistant steel, the secondary layer is about 0.25 μm to about 25 μm and comprises nickel, the noble metal layer is about 0.7 μm to about 1.3 μm thick and comprises at least one or more of gold, platinum, palladium and rhodium and the tertiary layer is about 0.25 μm to about 250 μm thick and comprises silver.

* * * * *